Patented Aug. 14, 1945

2,382,572

UNITED STATES PATENT OFFICE 2,382,572

MANUFACTURE OF LEVULINIC ACID

Walter G. Meyer, Warren, Pa., assignor to A. E. Staley Manufacturing Company, Decatur, Ill., a corporation of Delaware No Drawing. Application June 24, 1942, Serial No. 448,303

6 Claims. (Cl. 260—528)

The present invention relates to improvements in the manufacture of levulinic acid. More particularly, it pertains to an improvement in which increased yields of levulinic acid are obtained by a combination of steps which secures the addition of extracted quantities of residual levulinic acid recovered from tar residues remaining after the initial recovery of levulinic acid.

Primarily, the present invention is an improvement on the Moyer Patent No. 2,270,328 which discloses a process for the preparation of levulinic acid. In that process a dextrose-containing material such as starch is converted to levulinic acid and by-products such as humins by treatment with a dilute acid such as hydrochloric and the resulting acidic solution is filtered for removal of the humin. Subsequently the filtered liquor is neutralized with respect to its hydrochloric acid content and the neutralized solution is concentrated, the concentrated solution then being subjected to an operation for the removal of the resulting crystalline sodium chloride, and the mother liquor, after the removal of sodium chloride, is then subjected to a vacuum distillation process for the removal of levulinic acid. While the present invention is essentially an improvement on the Moyer patent it does contemplate the elimination of the neutralizing steps as well as the step for the removal of the resulting crystalline sodium chloride as will more fully appear hereinafter where an example of an alternate process is disclosed wherein these particular steps have been eliminated. However, with respect to either process it will be observed that after the vacuum steam step for the recovery of the levulinic acid has been completed there remains a residue which is a tar-like material and this contains about 50 per cent of levulinic acid and the balance of which is a black material or so-called humin.

A principal object of the present invention is the provision of a process whereby increased yields can be obtained by recovering from the tar residue the amount of levulinic acid contained therein.

Another object of the invention is to provide a process whereby the tar residue containing residual levulinic acid and humin, which remain after initial levulinic acid has been removed, is treated in such a manner that the same can be returned to the initial stage of the process and the humin of the residue filtered therefrom together with humin from a succeeding run and the filtrate subjected to a distillation step so that the residual levulinic acid may also be recovered together with the levulinic acid initially recovered from the succeeding run.

A further object of the invention is the provision of a process wherein the tar residue, remaining after initial separation of levulinic acid and humin from the process, is subjected to a supplemental steam distillation step to recover a fraction of levulinic acid combined with the humin in the tar residue and thereafter forming a water slurry of the remaining residue and returning the same to initial stages in the process whereby the remaining levulinic acid and humin are separated by filtering out the humin and subjecting the levulinic acid to evaporation and distillation and to combine the levulinic acid with a succeeding quantity of levulinic acid recovered.

A still further object of the invention is the provision of a process wherein the tar residue remaining after levulinic acid has initially been recovered is formed into a water slurry and the residual humin filtered out and the resulting filtrate returned to a step in the process whereby the residual levulinic acid may be recovered by distillation together with levulinic acid originally recovered from a next succeeding quantity continuously being run through said process.

Yet another object of the invention is the recovery of residual levulinic acid from the tar residue remaining after initial recovery of levulinic acid by subjecting the tar to a preliminary steam distillation step to recover a fraction of the levulinic acid and treating the remainder with water to form a slurry to permit the separation by filtration of residual humin and returning the filtrate containing the remaining fraction of residual levulinic acid to a step in the process for distillation in order to recover the residual levulinic acid continuously with levulinic acid originally being recovered from succeeding runs of a reaction mixture containing the same.

It is also an object of the invention to provide a process wherein the steps of neutralization of the hydrochloric acid and subsequent removal of the resulting crystalline sodium chloride can be eliminated and the hydrochloric acid together with formic acid can be eliminated in the evaporation operation.

Other objects of the invention will in part be obvious and will in part appear hereinafter.

The invention accordingly comprises the several steps and the relation of one or more of such steps with respect to each of the others thereof, which will be exemplified in the process hereinafter disclosed and the scope of the application of which will be indicated in the claims.

Actually the invention is based on the discovery that the black materials remaining in the tar residue after the original recovery of levulinic acid in such a process are either colloidal humin or decomposition products similar to humin formed during the time when the liquors are being evaporated; and that since this so-called humin is insoluble in water and that levulinic acid is soluble, the latter can be extracted from the remainder of the tar.

On mixing the tar with water the black insoluble substance resembling humin was formed and it was found that this could be filtered out in the same manner that humin is originally removed in the process by a separate filtration step, or by an initial filtration step in the process, and also that the resulting filtrate could then be separately distilled, or by an initial distillation step in the process to recover substantially completely all of the original levulinic acid as well as that from the tar.

Referring more particularly to a specific example which represents the hereinbefore mentioned alternate process for the production of levulinic acid, a .25 mol of hydrochloric acid was added to 1 mol of starch and sufficient water to make the final mixture approximately 1.72 per cent acid or 18° Baumé. This mixture was charged into a digestor where under heat and pressure it was converted to a hydrolyzate composed chiefly of hydrochloric acid, levulinic acid, formic acid, humin and water. The humin, a carbonaceous material, was filtered out in a centrifuge, washed, and then discarded. The filtrate, about 10 per cent levulinic acid, was evaporated under vacuum until the temperature of the liquor reached 160° F. at 26 inches. In this evaporation step the formic acid was vaporized together with most of the hydrochloric acid leaving a liquor which was 10 per cent water. This liquor was then steam-distilled at 225° F. under vacuum with forced circulation in a long tube still and the levulinic acid removed from the vapors by partial condensation, giving a final product of 98 to 99.5 per cent levulinic acid.

During such processes of distillation the original liquor to the still gradually becomes heavier and more viscous as the levulinic acid is distilled off, until finally a heavy tarry residue material remains. This tar residue it has been found contains at this point considerable amounts of residual levulinic acid and humin. In fact, at this point when the tar is about 50 per cent levulinic acid, it is drained and sent through an extraction step to further recover this residual levulinic acid.

Preferably this extraction is accomplished by adding to the residue a sufficient quantity of water, preferably about 5 pounds of water to about 1 pound of tar, and then agitating the mixture thoroughly. The final Baumé of this mixture is about 6°. At this dilution the tar will be completely dispersed, the residual levulinic acid is taken into solution leaving a fine humin in suspension, the humin being similar to that which is filtered out in the beginning of the process. A small amount of inorganic material introduced through the starch also remains soluble. The whole mixture forming a slurry is then preferably returned to the initial part of the process where it is added to the hydrolyzate from the digestor. The inorganic material goes into solution due to the presence of the acids in the hydrolyzate, while the humin from the tar is filtered out with the humin present in the hydrolyzate. Thus, only the humin component of the tar is actually discarded. There is a small amount of levulinic acid which is also discarded with this humin due to imperfect washing of the humin cake. However, this amount is small and is less than 1 per cent of the humin. With this process little of the inorganic material is removed. As a result, it accumulates in the system until it forms a sizeable precipitate in the evaporator. At intervals this precipitate can be drained, washed and discarded from the evaporated liquor. This has no material effect on the efficiency of the process. The water slurry now having been returned to the hydrolyzate or to the point where the initial separation of humin originally takes place as the result of starch and hydrochloric acid producing a reaction mixture containing levulinic acid and humin, the humin being separated with the original mass of humin, the remaining portion of the water slurry, namely the portion containing the residual levulinic acid from the tar residue, is advanced through the evaporation stage to the vacuum steam distillation step where the levulinic acid is recovered together with the initial recovery of succeeding runs of levulinic acid at this point in the process.

Another method of extracting the levulinic acid from the tar residue is similarly to agitate the hot tar with water to about 6° Baumé or about 5 pounds of water to 1 pound of tar. The resulting slurry can then be filtered separately. The unfiltrable solids in this case consist of both humin and inorganic material. When this method is used the inorganic material does not build up in the system. The filtrate having the humin removed need not now be returned to the hydrolyzate stage for further separation or filtration of humin but the filtrate containing the residual levulinic acid may immediately be returned to the subsequent evaporation and steam vacuum distillation stage of the process where the levulinic acid may be recovered together with levulinic acid initially being recovered in a next succeeding run.

A third procedure for treating the tar from the forced circulation still is to steam-distill the 50 per cent levulinic acid down to a 40 per cent acid tar in a pot still preferably equipped with an agitator. The levulinic acid may immediately be recovered after it is condensed or it may be returned as feed to the forced circulation still. The resulting 40 per cent tar is similarly agitated with water to 6° Baumé as above specified and then added to the hydrolyzate from the digestor where the residual humin will be separated together with a next succeeding run separating the original humin and then the remaining fraction of the levulinic acid will be advanced to the distillation step where the residual fraction of the levulinic acid from the tar residue is recovered together with levulinic acid concurrently with the initial separation from a succeeding batch.

As a fourth method the same procedure may be followed as in the third method outlined above except that after the preliminary steam distillation of the tarry residue the resulting 40 per cent tar after being agitated with the proper amount of water may then be filtered directly instead of being added to the hydrolyzate and the filtrate containing the levulinic acid fraction from the tar residue may be added directly to the steam distilling step so that the residual levulinic acid may be recovered with the original levulinic acid from a next succeeding run.

In any of the methods of extraction the levulinic acid present in the tar is completely recovered in the extraction process except perhaps a negligible amount which invariably remains with the washed humin. A comparison of the result with extraction and without extraction in which the tar from the forced circulation still is discarded, is as follows on a 100 pound starch basis:

|  | Non-extraction | Extraction | Pot-distillation and extraction |
|---|---|---|---|
| Pounds L. A. from 1st distillation | 24.6 | 24.6 | 24.6 |
| Pounds of tar (50% L. A.) | 8.0 | 8.0 | 8.0 |
| Pounds of L. A. recovered by 2nd distillation | 0 | 0 | 1.3 |
| Pounds L. A. recovered by extraction | 0 | 4.0 | 2.7 |
| Total overall L. A. produced | 24.6 | 28.6 | 28.6 |
| Theoretical L. A. | 71.7 | 71.7 | 71.7 |
| Per cent theoretical yield | 34.3 | 40 | 40 |

For example, when 100 pounds of starch is converted in a digestor, assuming a 45 per cent theoretical conversion, approximately 32.0 pounds of levulinic acid is produced. The filtered liquor containing the 32 pounds of levulinic acid is evaporated and then distilled. During both of these processes levulinic acid amounting to approximately 5 per cent of the theoretical escapes through the vapors due to vapor pressure phenomena, leaving 40 per cent of theoretical or 28.6 pounds remaining levulinic acid. Of this, 24.6 pounds is recovered as finished product in the distillation. The tar resulting from this distillation amounts to 8 pounds and is 50 per cent humin and 50 per cent levulinic.

The tar if discarded would mean the loss of 4 pounds of levulinic acid leaving an overall yield of only 34.3 per cent of the theoretical yield. However, this hot tar when agitated with about 45 pounds of water is dispersed. The resulting liquor preferably is then added to the following batch of hydrolyzate from the digestor, the whole mixture filtered and sent through the process. In this manner the remaining 4 pounds of levulinic acid in the tar is recovered and subsequently distilled with the following batch, giving an overall yield of 40 per cent.

When the pot distillation step is employed the 8 pounds of tar containing 4 pounds of levulinic acid is steam distilled in a pot still. Levulinic acid amounting to about 1.3 pounds is condensed from the vapors and may be sent back as feed to the long tube still where the finished product is produced. The tar, 6.7 pounds from the pot still, now contains only 2.7 pounds of levulinic acid. This mixture likewise is agitated with 40–45 pounds of water to further extract the residue levulinic acid. The resulting liquor can either be added to the digestor hydrolyzate or filtered separately and the filtrate returned to the evaporator. The recovery of the 2.7 pounds of levulinic acid by extraction followed by evaporation and distillation likewise gives an overall yield of 28.6 pounds or 40 per cent.

Under certain circumstances it is desirable to utilize the pot distillation method to secure a fractional removal of the residual levulinic acid from the tar. The reason for this is that the vacuum steam distillation step under certain conditions appears to develop a bottle neck in the process. In securing the removal of additional amounts of levulinic acid in this manner and the remainder by routing the water slurry back to a primary step in the process it will be appreciated that the recovery load can considerably be lightened at this point when circumstances warrant such procedure. To be able to do this is one of the distinct advantages of the invention.

Another advantage is the fact that it is desirable to route the water slurry for the removal of humin to a primary step in the process at any suitable convenient point where the original humin-like compounds are separated because it is at this point that it has been found that by placing a vigorously acting mechanical agitator in the reaction vessel the humin which has caused so much trouble heretofore in the production of levulinic acid will, as taught by Moyer, form in a granular state which does not stick to the walls of the reaction vessel and which can be removed from the reaction mixture and filtrated without difficulty. Routing the water slurry containing the humin from the tar residue to this point even more advantageously effects the removal of this humin because its separation in connection with the original granular humin formed by the prior removal seems even more quickly to be effected.

Of primary importance is the advantage that the recovery of substantially all of the levulinic acid present in the digestate, that is, 10 to 15 percent more than by previous known methods, has now been accomplished by the discovery that the tar-like residue is composed chiefly of humin and levulinic acid and that the latter being soluble in water can be extracted and the humin and levulinic acid routed through the process continuously to effect removal of a maximum levulinic acid.

Another advantage is the fact that increased yields are obtained without the addition of any special equipment and, where the alternate method as herein disclosed is utilized, the necessity for a neutralizing tank and centrifuge for removal of the sodium chloride is in fact eliminated. Finally, it should be noted that the process is more adaptable to continuous operation than previous methods of batch recovery.

It will thus be seen that the objects hereinbefore set forth may be readily and efficiently attained, and since certain changes may be made in carrying out the above described process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In the process of producing levulinic acid in which a starch and acid are reacted to produce a mixture of humin and levulinic acid which are subsequently separated by the successive steps of filtration and distillation respectively to recover the levulinic acid and produce a fluid tarry residue containing residual quantities of levulinic acid and humin, the improvement which comprises forming a water slurry of said tarry residue to precipitate solid humin from the resulting aqueous solution of levulinic acid, filtering out the resulting insoluble residual humin, and returning the filtrate to the original point of distillation in said process to recover said residual levulinic acid.

2. In the process of producing levulinic acid in which a starch and acid are reacted to produce a mixture of humin and levulinic acid which are subsequently separated by the successive steps of filtration and distillation respectively to recover the levulinic acid and produce a fluid tarry residue containing residual quantities of levulinic acid and humin, the improvement which comprises forming a water slurry of said tarry residue to precipitate solid humin from the resulting aqueous solution of levulinic acid, returning said slurry to the original point in the process of separation of said humin by filtration to effect the removal of the resulting insoluble residual humin, and advancing the remaining filtrate to a subsequent point in the process for ultimate recovery of said residual levulinic acid at the original point of distillation for recovering initial amounts of levulinic acid.

3. In the process of producing levulinic acid in which a dextrose-containing carbohydrate and an acid are reacted to produce a mixture of humin and levulinic acid which are subsequently separated by the successive steps of filtration and distillation respectively to recover the levulinic acid and produce a fluid tarry residue containing residual quantities of levulinic acid and humin, the improvement which comprises forming a water slurry of said tarry residue to precipitate solid humin from the resulting aqueous solution of levulinic acid, filtering out the humin, and subjecting the filtrate to distillation to recover the levulinic acid contained therein.

4. In the process of producing levulinic acid in which a dextrose-containing carbohydrate and hydrochloric acid are reacted to produce a mixture of humin and levulinic acid which are subsequently separated by the successive steps of filtration and distillation respectively to recover the levulinic acid and produce a fluid tarry residue containing residual quantities of levulinic acid and humin, the improvement which comprises forming a water slurry of said tarry residue to precipitate solid humin from the resulting aqueous solution of levulinic acid, and separating the filtrate from the humin to recover the levulinic acid contained therein.

5. In the process of producing levulinic acid in which a dextrose-containing carbohydrate and an acid are reacted to produce a mixture of humin and levulinic acid which are subsequently separated by the successive steps of filtration and distillation respectively to recover the levulinic acid and produce a fluid tarry residue containing residual quantities of levulinic acid and humin, the improvement which comprises forming a water slurry of said tarry residue to precipitate solid humin from the resulting aqueous solution of levulinic acid, filtering out the resulting insoluble residual humin, and returning the filtrate to the original point of distillation in said process to recover said residual levulinic acid.

6. In the process of producing levulinic acid in which a dextrose-containing carbohydrate and a mineral acid are reacted to produce a mixture of humin and levulinic acid which are subsequently separated by the successive steps of filtration and distillation respectively to recover the levulinic acid and produce a fluid tarry residue containing residual quantities of levulinic acid and humin, the improvement which comprises forming a water slurry of said tarry residue to precipitate solid humin from the resulting aqueous solution of levulinic acid, returning said slurry to the original point in the process of separation of said humin by filtration to effect the removal of the resulting insoluble residual humin, and advancing the remaining filtrate to a subsequent point in the process for ultimate recovery of said residual levulinic acid at the original point of distillation for recovering initial amounts of levulinic acid.

WALTER G. MEYER.